United States Patent [19]

Brothers

[11] Patent Number: 5,484,478

[45] Date of Patent: Jan. 16, 1996

[54] HIGH TEMPERATURE SET RETARDED CEMENT COMPOSITIONS AND METHODS

[75] Inventor: Lance E. Brothers, Ninnekah, Okla.

[73] Assignee: Halliburton Company, Duncan, Okla.

[21] Appl. No.: 424,167

[22] Filed: Apr. 19, 1995

[51] Int. Cl.$^6$ ............................. C04B 24/00; C04B 24/04
[52] U.S. Cl. ................... 106/696; 106/724; 106/802; 106/806; 106/819; 106/823; 405/266; 405/267; 524/3; 524/5; 524/547
[58] Field of Search .................... 106/696, 724, 106/802, 806, 819, 823; 405/128, 129, 266, 267; 524/3, 5, 547; 523/130; 166/292, 293

[56] References Cited

U.S. PATENT DOCUMENTS

| | | | |
|---|---|---|---|
| 2,233,974 | 3/1941 | Dunn | 106/24 |
| 2,848,340 | 8/1958 | Haldas | 106/90 |
| 3,964,921 | 6/1976 | Persinski et al. | 106/90 |
| 4,557,763 | 12/1985 | George et al. | 106/90 |
| 4,676,832 | 6/1987 | Childs et al. | 106/90 |
| 5,263,542 | 11/1993 | Brothers | 166/293 |

*Primary Examiner*—Paul Marcantoni
*Attorney, Agent, or Firm*—Robert A. Kent

[57] ABSTRACT

Set retarded cement compositions and methods of using the compositions for cementing zones in wells at temperatures in the range of from about 200° F. to about 450° F. are provided. The compositions are basically comprised of hydraulic cement, water and a set retarding polymer containing repeating units having the formula

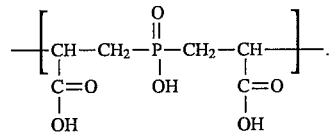

11 Claims, No Drawings

HIGH TEMPERATURE SET RETARDED CEMENT COMPOSITIONS AND METHODS

BACKGROUND OF THE INVENTION

1. Field of the Invention

The present invention relates generally to set retarded cement compositions and methods of using the compositions for cementing subterranean zones in wells.

2. Description of the Prior Art

A variety of procedures involving hydraulic cement compositions are utilized in the completion and repair of wells such as oil and gas wells. For example, in the completion of a well after a well bore has been drilled into one or more subterranean producing formations, casing is typically disposed in the well bore and cemented therein. That is, a hydraulic cement composition is pumped into the annular space between the walls of the well bore and the exterior of the casing. The cement composition is allowed to set in the annular space whereby an annular cement sheath is formed therein which bonds the casing to the walls of the well bore and prevents the undesirable flow of fluids into and through the annular space. This type of cementing procedure is referred to in the art as primary cementing.

In repairing producing wells, hydraulic cement compositions are often utilized to plug holes or cracks in the pipe disposed in the well bore; to plug holes, cracks, voids or channels in the above mentioned cement sheath between casing and the well bore; to plug permeable zones or fractures in subterranean formations and the like. The holes, cracks, etc. are repaired by forcing hydraulic cement compositions thereinto which harden and form impermeable plugs therein.

High temperatures are frequently encountered in deep subterranean zones to be cemented. The combination of the depth of the zone and the high temperature thereof often results in the requirement that the setting time of the cement composition be extended to allow the cement composition to be pumped into the zone to be cemented. This is particularly true in primary cementing whereby the cement composition must be pumped to the bottom of the well bore and then upwardly into the annulus between the casing and the well bore. The temperature at the bottom of the well bore through which the cement is pumped is typically the hottest location in the well bore.

A variety of set retarding additives have been developed and used for extending the time in which a cement composition sets. Such additives have been mixed with well cement compositions in amounts sufficient to delay the setting of the compositions until they can be pumped into desired subterranean locations.

While set retarding additives have been used successfully in well cement compositions heretofore, they can and often do produce erratic results in cement compositions of different component make-up. Also, a number of the prior set retarding additives cause premature gelation of cement compositions when the cement compositions are subjected to the high temperature environments of deep subterranean zones, i.e., temperatures of 200° F. and higher. The gelation referred to is the abnormal increase in viscosity of a cement composition without an increase in compressive strength. The increase in viscosity makes the cement composition difficult or impossible to pump even though the cement composition has not set.

Thus, there is a continuing need for improved set retarded cement compositions and methods of using such compositions at high temperature without premature gelation and other problems being encountered.

SUMMARY OF THE INVENTION

Improved set retarded cement compositions and methods of using the compositions for cementing wells at high temperatures are provided which meet the needs described above and overcome the shortcomings of the prior art. The set retarded cement compositions of the present invention are basically comprised of hydraulic cement, sufficient water to form a slurry and a set retarding polymer containing repeating units having the formula

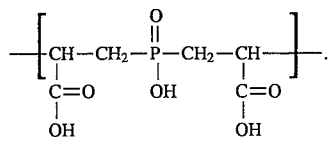

Preferably, the set retarding polymer has an average molecular weight of about 4000, and is present in the cement composition in an amount in the range of from about 0.1% to about 3.0% by weight of dry cement therein. The cement composition also preferably includes a silica source such as silica flour, fume silica or amorphous silica for preventing cement compressive strength deterioration after the cement composition has set in a high temperature environment.

The methods of the invention basically comprise the steps of forming a pumpable set retarded cement composition of the invention, pumping the composition into the zone to be cemented and allowing the composition to set in the zone.

It is, therefore, a general object of the present invention to provide improved high temperature set retarded cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The set retarded hydraulic cement compositions of this invention are basically comprised of a hydraulic cement, sufficient water to form a slurry of the cement, and a set retarding polymer. While various hydraulic cements can be utilized in the cement compositions, Portland cement is generally preferred, and can be, for example, one or more of the various types identified as API Classes A-H and J cements. These cements are classified and defined in *API Specification For Materials And Testing For Well Cements*, API Specification 10A, 22nd Edition dated Jan. 1, 1995, of the American Petroleum Institute, Washington, D.C. API Portland cements generally have a maximum particle size of about 90 microns and a specific surface (sometimes referred to as Blaine Fineness) of about 3900 square centimeters per gram. A highly useful and effective cement slurry base for use in accordance with this invention comprises API Class H Portland cement mixed with water to provide a density of from about 11.3 to about 18.0 pounds per gallon.

It is often highly advantageous to use a fine particle size hydraulic cement consisting of particles having diameters of about 30 microns and having a Blaine Fineness of about 6000 square centimeters per gram. Preferably, the fine cement particles have diameters no larger than about 17 microns and most preferably no larger than about 11 microns. The Blaine Fineness is preferably greater than about 7000 square centimeters per gram, more preferably about 10000 square centimeters per gram and still more preferably greater than about 13000 square centimeters per gram. Methods of utilizing such fine particle size hydraulic cement in well completion and remedial operations are disclosed in U.S. Pat. Nos. 5,121,795 issued Jun. 16, 1992 to Ewert et al. and 5,125,455 issued Jun. 30, 1992 to Harris et al., both of which are assigned to the assignee of this present invention and are incorporated herein by reference.

The water utilized in the cement compositions of this invention can be water from any source, provided that it does not contain an excess of compounds which adversely react with or otherwise affect other components in the cement compositions. The water is added to the dry cement used in an amount sufficient to form a slurry of the cement, preferably a slurry which is readily pumpable. When the cement is of normal particle size such as an API Portland cement, the water is combined with the cement in an amount in the range of from about 30% to about 60% by weight of dry cement in the composition. When a cement of fine particle size as described above is used, water is combined with the cement in an amount in the range of from about 100% to about 200% by weight of dry cement in the composition. Preferably, a dispersing agent is included in the water prior to mixing it with the dry cement in order to facilitate the formation of the cement slurry and prevent the premature gelation thereof. A preferred such dispersing agent is the condensation polymer product of acetone, formaldehyde and sodium sulfite. That dispersing agent and others are described in U.S. Pat. No. 4,557,763 issued on Dec. 10, 1985 to George et al.

The set retarding polymer utilized in the compositions of this invention are relatively inexpensive, do not cause premature gelation and bring about predictable cement composition thickening and setting times at high temperatures, i.e., temperatures in the range of from about 200° F. to 450° F. and higher.

The set retarding polymer contains repeating units having the formula

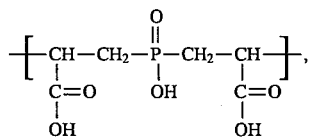

and preferably has an average molecular weight of about 4000. The low molecular weight of the polymer is advantageous in that a cement composition containing it is not over dispersed and, as mentioned, does not flash gel. The presence of the polymer in the cement composition converts the cement composition to a stabilized, low viscosity thixotropic fluid as well as retarding the set of the composition.

The set retarding polymer is included in a cement composition of this invention in an amount sufficient to retard or delay the setting of the composition for a time period required to place the composition in a desired location. When the cement composition is utilized to carry out completion, remedial and other cementing operations in a high temperature subterranean zone, the composition must remain pumpable for a relatively long period of time. The specific amount of polymer required for retarding the set of a cement composition at a particular temperature for a particular time can be determined in advance by performing thickening time tests of the type described in the above mentioned API Specification 10A. Generally, the set retarding polymer is included in the cement composition in an amount in the range of from about 0.1% to about 3.0% by weight of dry cement in the composition.

The set retarding polymer is a dry powder which can be mixed with the dry cement prior to forming a slurry of the cement with water, or the polymer can be dissolved in water to form a 50% active solution which can be combined with the cement mixing water prior to forming a slurry.

The cement compositions of this invention also preferably include a silica source such as silica flour, fumed silica, amorphous silica or the like. The presence of silica in the cement composition prevents a condition known in the art as cement compressive strength retrogression. Such compressive strength retrogression or deterioration occurs in a cement composition after it sets and remains in a high temperature environment. Generally, the silica source, preferably silica flour, is included in the cement composition in an amount in the range of from about 35% to about 100% by weight of dry cement in the composition.

A variety of other additives are often included in well cement compositions in addition to set retarding additives. Such other additives are well known to those skilled in the art and are included in well cement compositions to vary the composition density, increase or decrease strength, control fluid loss, reduce viscosity, increase resistance to corrosive fluids and the like. Essentially, a cement composition meeting the specifications of the American Petroleum Institute is mixed with the additives necessary to provide a cement slurry appropriate for the conditions existing in each individual subterranean zone to be cemented.

A particularly preferred set retarded cement composition of this invention for use in high temperature well cementing is comprised of API Class H Portland cement, water present in an amount sufficient to form a readily pumpable slurry of the cement, e.g., an amount in the range of from about 30% to about 60%, more preferably from about 35% to about 50%, by weight of dry cement, a set retarding polymer having an average molecular weight of about 4000 and containing repeating units having the formula

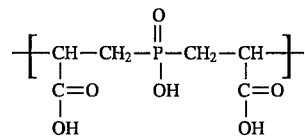

present in the composition in an amount in the range of from about 0.1% to about 3.0%, more preferably from about 0.3% to about 2.5%, by weight of dry cement and silica flour present in the composition in an amount in the range of from about 35% to about 100%, more preferably from about 35% to about 50%, by weight of dry cement.

The methods of this invention for cementing a subterranean zone penetrated by a well bore at high temperatures, i.e., temperatures in the range of from about 200° F. to about 450° F., are basically comprised of the steps of forming a pumpable set retarded cement composition of this invention, pumping the cement composition into the subterranean zone by way of the well bore, and then allowing the cement composition to set therein.

In order to further illustrate the compositions and methods of this invention, the following examples are given.

EXAMPLE 1

Various quantities of the set retarding polymer described above were added to test portions of a base cement slurry. The base cement slurry was comprised of API Class H hydraulic cement and fresh water in an amount of 35% by weight of the cement. The base slurry had a density of 15.9 pounds per gallon.

The test cement composition samples containing various quantities of the set retarding polymer were tested for thickening times at various temperatures in accordance with the standard API thickening time testing procedures set forth in the API Specification 10A referred to above. The results of these tests are set forth in Table I below.

TABLE I

Thickening Times of Set Retarded Cement Compositions At High Temperatures

| Amount of Set Retarding Polymer, % By Weight of Dry Cement | Thickening Times, hr:min. | | | | |
|---|---|---|---|---|---|
| | 250° F. | 302° F. | 348° F. | 400° F. | 450° F. |
| 0.3 | 12:17 | — | — | — | — |
| 0.5 | — | 5:58 | — | — | — |
| 1.0 | — | 10:14 | 4:54 | — | — |
| 2.0 | — | — | — | 4:19 | — |
| 2.5 | — | — | — | 4:13 | — |
| 3.0 | — | — | — | — | 2:52 |

EXAMPLE 2

Additional thickening time tests were run in accordance with the procedure described in Example 1 except that the set retarding polymer utilized was slightly different than the set retarding polymer used in Example 1. That is, the set retarding polymers used in both of Example 1 and Example 2 had average molecular weights of about 4000. However, the polymer utilized in Example 2 had a slightly broader molecular weight distribution than the polymer utilized in Example 1. The results of the tests utilizing the polymer with broader molecular weight distribution are set forth in Table II below.

TABLE II

Thickening Times of Set Retarded Cement Compositions At High Temperatures

| Amount of Set Retarding Polymer[1], % By Weight of Dry Cement | Thickening Times, hr:min. | |
|---|---|---|
| | 250° F. | 450° F. |
| 0.3 | 10:59 | — |
| 2.0 | — | 3:32 |

[1]Set retarding polymer has a slightly broader M. W. distribution than polymer used in Example 1.

From the results set forth in Table I and Table II above, it can be seen that the cement compositions of this invention produce excellent thickening times at temperatures in the range of from about 200° F. to about 450° F.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A set retarded cement composition for cementing a zone in a well comprising:

hydraulic cement;

sufficient water to form a slurry; and a set retarding polymer containing repeating units having the formula

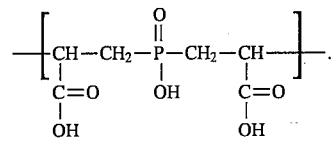

2. The composition of claim 1 wherein the average molecular weight of said set retarding polymer is about 4000.

3. The composition of claim 1 wherein said hydraulic cement is a Portland cement.

4. The composition of claim 3 wherein said water is present in an amount in the range of from about 30% to about 60% by weight of dry cement in said composition.

5. The composition of claim 1 wherein said hydraulic cement is a fine particle size cement, said water is present in an amount in the range of from about 100% to about 200% by weight of dry cement in said composition and said composition further comprises a dispersing agent to facilitate the formation of said slurry and prevent the premature gelation thereof.

6. The composition of claim 1 wherein said set retarding polymer is present in an amount in the range of from about 0.1% to about 3.0% by weight of dry cement in said composition.

7. The composition of claim 1 which further comprises a silica source selected from the group consisting of silica flour, and fumed silica.

8. The composition of claim 7 wherein said silica source is silica flour present in an amount in the range of from about 35% to about 100% by weight of dry cement in said composition.

9. A set retarded cement composition for cementing a zone in a well having a temperature in the range of from about 200° F. to about 450° F. comprising:

API Class H Portland cement;

sufficient water to form a pumpable slurry; and a set retarding polymer having an average molecular weight of about 4000 and containing repeating units having the formula

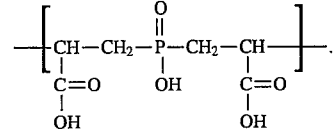

10. The composition of claim 9 wherein said set retarding polymer is present in an amount in the range of from about 0.1% to about 3.0% by weight of dry cement in said composition.

11. The composition of claim 10 wherein said composition further comprises silica flour present in an amount in the range of from about 35% to about 100% by weight of dry cement in said composition.

* * * * *